(12) United States Patent
Erving et al.

(10) Patent No.: US 7,139,323 B2
(45) Date of Patent: Nov. 21, 2006

(54) MULTI-FREQUENCY DATA TRANSMISSION CHANNEL POWER ALLOCATION

(75) Inventors: Richard Henry Erving, Piscataway, NJ (US); Lalitha Sankaranarayanan, Morris Plains, NJ (US)

(73) Assignee: AT&T Corp., New York, NY (US)

( * ) Notice: Subject to any disclaimer, the term of this patent is extended or adjusted under 35 U.S.C. 154(b) by 850 days.

(21) Appl. No.: 10/226,444

(22) Filed: Aug. 23, 2002

(65) Prior Publication Data

US 2003/0084394 A1 May 1, 2003

Related U.S. Application Data

(60) Provisional application No. 60/315,724, filed on Aug. 29, 2001.

(51) Int. Cl.
*H04K 1/10* (2006.01)
*G06F 11/00* (2006.01)
*H03D 1/00* (2006.01)
*H04B 7/00* (2006.01)

(52) U.S. Cl. .................. 375/260; 375/341; 455/522

(58) Field of Classification Search ............... 375/260, 375/340–341; 714/752–792, 794, 755; 455/522
See application file for complete search history.

(56) References Cited

U.S. PATENT DOCUMENTS 5,479,447 A 12/1995 Chow et al.

5,822,374 A 10/1998 Levin et al.

FOREIGN PATENT DOCUMENTS

| EP | A-0905948 | 3/1999 |
|----|-----------|--------|
| EP | A-0918422 | 5/1999 |
| EP | A-0930752 | 7/1999 |

OTHER PUBLICATIONS

Zogakis, T. N., et al., "Analysis of a Concatenated Coding Scheme for a Discrete Multitone Modulation System," *Conference Record*, Military Communications Conference, 1994 (MILCOM '94), Fort Monmouth, New Jersey, Oct. 2-5, 1994, pp. 433-437.

*Primary Examiner*—Khai Tran
*Assistant Examiner*—Cicely Ware

(57) ABSTRACT

A method of controlling a communication device that is operable to transmit digital data over a plurality of frequency channels. The method includes selecting an initial transmission power and a corresponding data rate for each channel. The method also includes identifying in a first channel a first ratio of a first decrement in transmission power to a first data rate decrement that is greater than a second ratio of a second decrement in transmission power to a second data rate decrement. Then, the initial transmission power allocation of the first channel is reduced by the first decrement. The method also includes reallocating the decremented initial transmission power of the first channel to one or more other channels.

18 Claims, 8 Drawing Sheets

MULTI-FREQUENCY DATA TRANSMISSION CHANNEL POWER ALLOCATION

This application claims the benefit of U.S. Provisional Patent Application Ser. No. 60/315,724, filed Aug. 29, 2001.

FIELD OF THE INVENTION

The present invention relates generally to digital communications, and more particularly, to multi-frequency data transmission.

BACKGROUND OF THE INVENTION

Digital communications may be carried out in a variety of ways. One method involves multiple frequency data transmission over analog communication lines. For example, discrete multi-tone (DMT) communications are employed by digital communication devices to transmit data over copper twisted-pair lines. Copper twisted-pair lines have been, and continue to be, widely employed in the telephone network, particularly for residential subscriber lines. As the need for high speed data communications to residential subscribers has increased, the implementation of DMT communications via digital subscriber line (DSL) modems has increased.

In the use of DMT communications, a DMT modulator modulates data onto a plurality of discrete tones. The modulated signal is then transmitted over the twisted-pair telephone lines to a point at which the data signal is recovered by a compatible receiver. A problem with DMT communications is that particular carrier frequencies selected for data modulation are within the frequency spectrum that may likewise be used for airborne signals, such as, for example, AM radio broadcasting. In particular, ingress of such airborne signals into a DMT communication line can interfere with the data transmission of the DMT modulators. Moreover, cross-talk from adjacent twisted pair lines carrying other DMT communications can cause interference.

The sources of interference cause a reduction in the effective data rate of a DMT communication link. Typically, the interference affects different tones of the multi-tone signal in different ways, depending upon the frequency characteristics of the interference. Noise from other sources can thus detract from the bit-carrying capacity or data rate on the various channels of the overall DMT signal. Because, among other things, noise and interference varies from DMT channel to DMT channel, some tones or channels on the same twisted pair line can carry more data than other tones. As a result, it is known to effect DMT communications by allocating different numbers of bits on each channel, based in part on the data rate capacity of each channel.

Effective allocation of bits on each channel requires, among other things, information as to the attenuation and noise present on each channel. To obtain such information, a test signal, typically a known pseudorandom signal, is transmitted over the line to a receiver using the entire multi-tone or multi-channel signal band. The receiver computes the impulse response over the signal band by computing the coherence between the received signal and its known content. In addition, the noise spectrum over the signal band is measured by measuring the received signal when the transmitter is silent. The impulse response and the noise spectrum then provide sufficient information to determine the per channel transfer function. With the channel transfer functions known, the highest achievable data rate, given a known power constraint, may be calculated for each channel. In general, a goal of DMT transmission is to achieve the highest data rate with the least amount of power.

A well-known method of allocating bits to channels in a DMT system is the so-called "water pouring" algorithm attributed to R. C. Gallager in "Information Theory and Reliable Communications", (Wiley, 1968). The water pouring assumes well-defined noise and attenuation characteristics throughout the channel frequencies of a signal spectrum. These characteristics define a "terrain" of the spectrum. Allocating power is then similar to pouring a limited amount of water over the terrain with the same final level over the entire terrain, with the "water" depth at any point depending on the shape of the terrain. For the case of power allocation, the analogy translates to having equal power in all the bins that can hold power.

In this analogy, the "deepness" of each channel defines the maximum data rate for that channel. For example, frequency channels with the "deepest" water may transmit the most bits. Because power is evenly distributed, those channels that require less power to overcome noise and attenuation characteristics will be able to handle higher data rates.

A completely flat or even power distribution between the channels of a multi-channel signal is inherently inefficient, however, because of the relationship between power allocation and maximum data rate. Specifically, the relationship between available signal to noise power (i.e. water depth) and data rate is not smooth and continuous. In practical applications, data rates change in discrete steps. Thus, slight increases or decreases in power do not necessarily change the maximum possible data rate for a channel. Accordingly, in the water pouring algorithm, the equal allocation of power in the channels results in many or most channels having available signal to noise power that is somewhat in excess of that required for the closest possible data rate.

Existing algorithms seek to slightly adjust the otherwise even power distribution such that at least some of the excess power from some channels is reallocated to other channels that may be close to having enough power to support the next highest data rate. The result is that each channel that can carry data has roughly the same amount of power, however, with slight variations to account for the discrete power requirement steps for various data rates.

There are a number of factors that result in reduced performance of modems that employ the water pouring algorithm. One factor arises from the underlying assumption that the use of an equal amount of power provides the most efficient use of power over several channels. While this assumption is basically correct, it is also known that certain parts of the transmit power/data rate curve are inherently inefficient due to the characteristics of the coding schemes used to encode the data prior to DMT modulation. Thus, even when power is evenly distributed over several channels, a particular channel may be operating somewhat inefficiently at its particular power level.

There is a need, therefore, for a method and/or arrangement for allocating power and data bits to channels of a multifrequency communication circuit that has improved efficiency. There is further a need for a method and/or arrangement for allocating power that takes into account the efficiencies of the encoding schemes that are employed.

SUMMARY OF THE INVENTION

The present invention addresses the above needs, as well as others, by providing a method and apparatus for controlling a communication device that performs additional optimization by iteratively removing power from some channels and reallocating power to other channels that can transmit additional bits more efficiently. In general, power is removed from channels in which large amounts of power may be removed without large reduction in data rate, and reallocated to channels in which relatively small amounts of power can result in significant increases in data rate. Thus, power is reallocated to channels that can transmit more efficiently. Alternatively, or in addition, the method and apparatus for controlling a communication device adjusts the operational parameters of both an outer coder and an inner coder to achieve more efficient transmission of data. In either case, the increased transmission efficiency provides the advantage of increasing the overall, multi-channel data rate for a given amount of power, or reduce the power required to transmit at a given overall data rate.

A first embodiment of the invention is a method of controlling a communication device, the communication device operable to transmit digital data over a plurality of frequency channels. The method includes selecting an initial transmission power and a corresponding data rate for each channel. The method also includes identifying in a first channel a first ratio of a first decrement in transmission power to a first data rate decrement that is greater than a second ratio of a second decrement in transmission power to a second data rate decrement. Then, the initial transmission power allocation of the first channel is reduced by the first decrement. The method also includes reallocating the decremented initial transmission power of the first channel to one or more other channels.

A second embodiment of the invention is a method of controlling a communication device that includes an inner coder and an outer coder, the communication device operable to transmit digital data over a plurality of frequency channels. The method includes obtaining a characteristic of each of the plurality of frequency channels. The method also includes selecting performance parameters of the inner coder for each channel and performance parameters of the outer coder for each channel based in part on the obtained characteristic of the channel. The method further includes allocating data to be transmitted to each channel.

The above described features and advantages, as well as others, will become more readily apparent to those of ordinary skill in the art by reference to the following detailed description and accompanying drawings.

DETAILED DESCRIPTION

Figure 1:
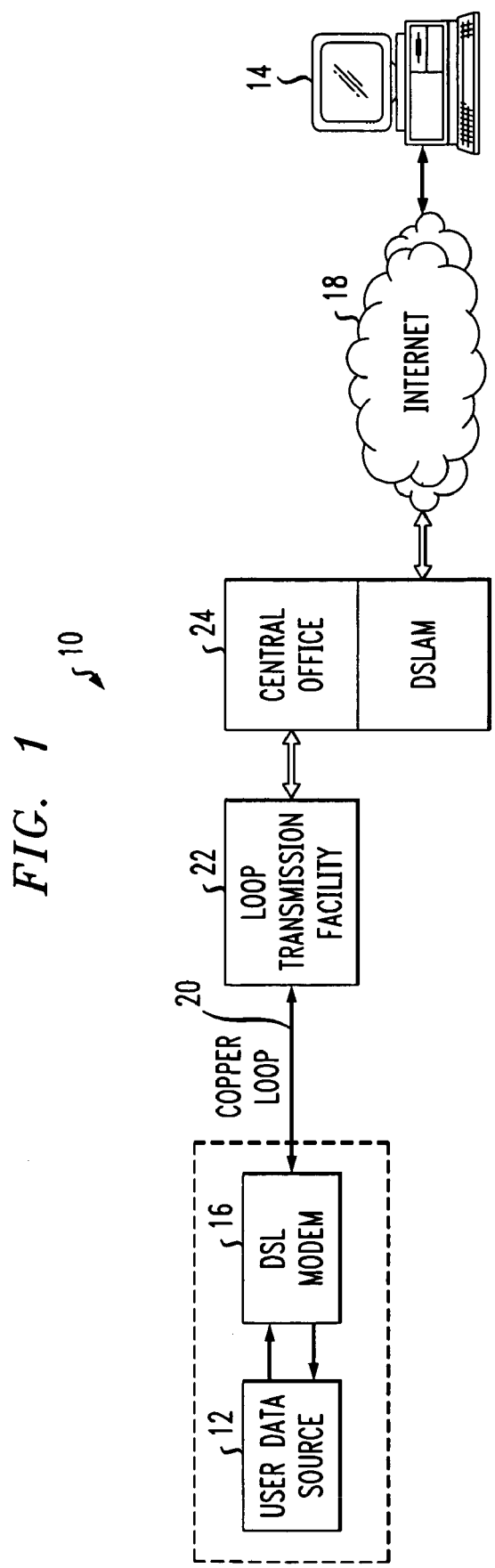
FIG. 1 shows an exemplary communication network connection in which a modem according to the present invention is employed.

FIG. 1 shows an exemplary communication network connection 10 in which a modem according to the present invention is employed. In general, the network connection 10 facilitates the flow of data between a user data source 12 and a remote processing device 14. The user data source 12 may suitably comprise a general purpose computer such as a personal computer or the like. The remote processing device 14 may suitably be a web server device, another end-user personal computer, or other internet-capable processing device. By way of example, the user data source 12 may be an ordinary consumer and the remote processing device 14 may be a computer that hosts a commercial website that allows a user located at the user data source 12 to purchase goods or services.

The user data source 12 is coupled to communicate data bidirectionally with a DSL modem 16. The DSL modem 16 is a device that is operable to communicate data over analog telephone lines using DMT communication techniques. In accordance with one aspect of the present invention, the DSL modem 16 is further operable to adjust parameters in both its inner and outer coders on a per frequency channel (or bin) basis to improve its power per transmitted bit efficiency. In accordance with another aspect of the present invention, the DSL modem is also operable to iteratively remove power from certain bins and reallocate power to other bins based on how efficiently the modem operates at the frequencies associated with those bins. Further detail regarding these aspects is provided below in connection with FIGS. 2–5. It will be appreciated that at least some of the advantages of the present invention may be obtained in a modem or other multi-frequency communication device that performs only one of the two efficiency-improving operations.

It will further be appreciated that the exemplary network connection 10 is given by way of illustrative example only. The DSL modem 12 is configured to, or readily adapted to be configured to, operate in any environment in which DMT communications are employed.

Referring again to FIG. 1, the DSL modem 16 is operably coupled to transmit data through an ordinary telephone network to the Internet 18. The Internet 18 may then communicate data to and from the remote processing unit 14 using any of a plurality of well-known techniques.

The telephone network connection between the DSL modem 16 and the Internet is now described. In general, the DSL modem 16 operates as an end terminal in the telephone network. The DSL modem 16 is coupled to communicate DMT-modulated analog signals to and from a central office 24 of the telephone system through a subscriber loop 20 and a loop transmission facility 22. As is known in the art, the telephone system includes a Each central office is connected to other central offices via trunks, not shown, and to a distinct plurality of end terminals, not shown, which may include analog telephone receivers, DSL modems, and other types of modems.

Referring again specifically to the network connection 10, the subscriber loop 20 includes a copper, twisted-pair cable that is designed to transport analog telephone signals. Such subscriber loops 20 are commonly employed in the telephone network and are well-known. The loop transmission facility 22 is one or more devices that bundle signals received from subscriber loop 20 with other signals from other subscriber loops, not shown, and communicate the signals to (and from) the central office 24.

The central office 24 includes a switching network, not shown, which routes communication signals through to other end terminals either directly, or through other central offices on the telephone network. Located at or near the central office 24 is a digital subscriber line access multiplexer ("DSLAM") 26. The DSLAM 26 is operably coupled to communicate digital signals between the Internet 18 and the central office 24. Accordingly, the DSLAM 26 is configured to receive DMT-modulated signals, such as those transmitted by the modem 16, and translate the signals into the digital signal format employed by the Internet 18. DSLAM devices are also well-known in the art.

It will be appreciated that in many cases, the user data source 12 and the DSL modem 16 are housed together within the computing system owned by the end user.

Figure 2:
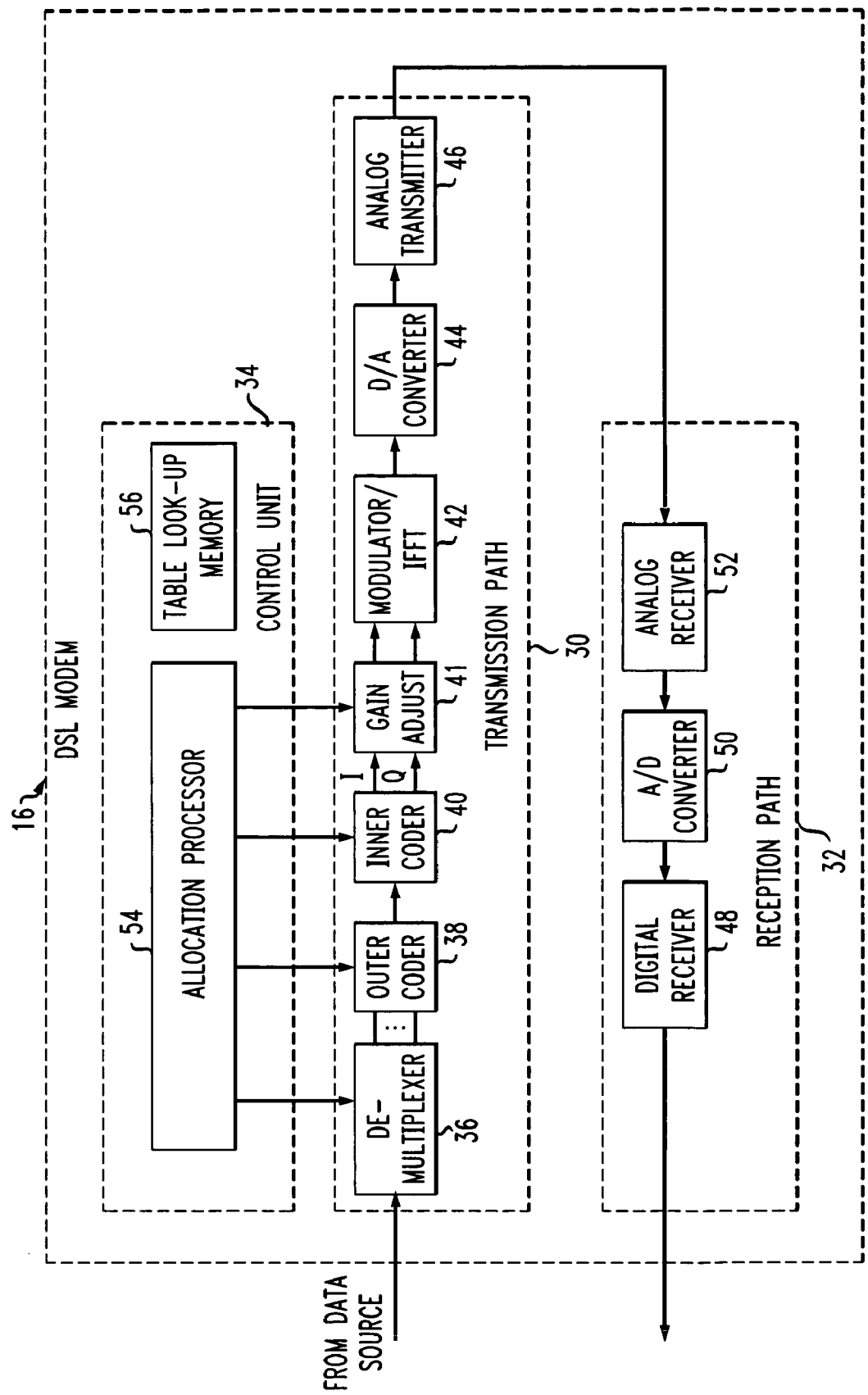
FIG. 2 shows a block diagram of an exemplary embodiment of a DSL modem that incorporates aspects of the invention.

FIG. 2 shows in further detail an exemplary embodiment of the DSL modem 16 of FIG. 1. In general, the DSL modem 16 includes a transmission path 30, a reception path 32, and a control unit 34. The transmission path 30 includes a demultiplexer 36, an outer coder 38, an inner coder 40, a digital gain adjust 41, a modulator/IFFT block 42, a digital to analog ("D/A") converter 44 and an analog transmitter 46. The reception path 32 includes a digital receiver 48, an analog to digital ("AID") converter 50 and an analog receiver 52. The control unit 34 includes an allocation processor 54 and a table look-up memory 56.

In general, the demultiplexer 36, outer coder 38, inner coder 40, digital gain adjust 41, modulator/IFFT block 42, and digital receiver 48 are functional blocks that may be embodied as operations within one or more digital signal processors or other types of processors. The allocation processor 54 represents a functional block that may be executed by a separate processor, or a processor shared with other functional blocks. Accordingly, it will be appreciated that the configuration of processing units employed to carry out the functions ascribed to the various functional blocks is not germane to the invention. Those of ordinary skill in the art may readily configure the processing circuit in a manner that best suits their implementation needs.

Referring specifically to the transmitter 30, the demultiplexer 36 is operably coupled to receive data to be transmitted, or payload data, from an external source such as the user data source 12 of FIG. 1. The demultiplexer 36 is operable to demultiplex or divide the incoming data into a plurality of N parallel channels or bins. Each of the N bins corresponds to one of N carrier frequencies or tones, $f_i$, where i=1–N. The demultiplexer 36 provides the N demultiplexed data signals to the outer coder 38. To this end, the demultiplexer 36 divides the incoming data to specific bins in accordance with control signals provided by the allocation processor 54.

As discussed above, the data in each bin is ultimately modulated onto one of the discrete tones or carrier frequencies fi of the multitone signal. Accordingly, the allocation of the incoming data to the various bins of by the allocation processor 54 and the demultiplexer 36 effectively assigns the incoming data to the frequency channels or tones on which it will be modulated. As discussed further below, the allocation processor 54 provides control signals that allocates data to bins in a manner that improves the overall data rate/transmission power efficiency.

The outer coder 38 is a forward error correction device that incorporates, among other things, parity symbols that are used for error correction on the receive side. In general, the outer coder 38 receives data bits for each of the N bins from the demultiplexer and produces data blocks for each bin. Each data block includes the payload symbols from the demultiplexer 36 and a number of parity symbols. Each payload symbol includes a number of payload bits, e.g. eight, while each parity symbol includes a number parity bits, e.g. eight. Thus, the output of the decoder may be characterized as having n bits total output, k payload bits, and n-k parity bits. It is known that if more parity symbols are used per payload symbol, then less power is required to achieve a desired bit error rate in transmission. If more power is used, then less parity symbols are required to achieve the same bit error rate.

The forward error correction device may take many forms, but is a linear block coder in the embodiment described herein. A Reed-Solomon encoder is a nonlimiting example of a suitable linear block coder. In any event, the outer coder 38 is coupled to receive control or parameter signals from the allocation processor 54. Specifically, the outer coder 38 is configured to receive a control signal that specifies, for each bin, a number representative of the number of parity symbols per payload symbol. In accordance with one embodiment of the present invention, the allocation processor 54 adjusts the parity symbol rate of the outer coder 38 for one or more bins or channels $f_i$ in order to increase the overall transmission efficiency.

Figure 3:
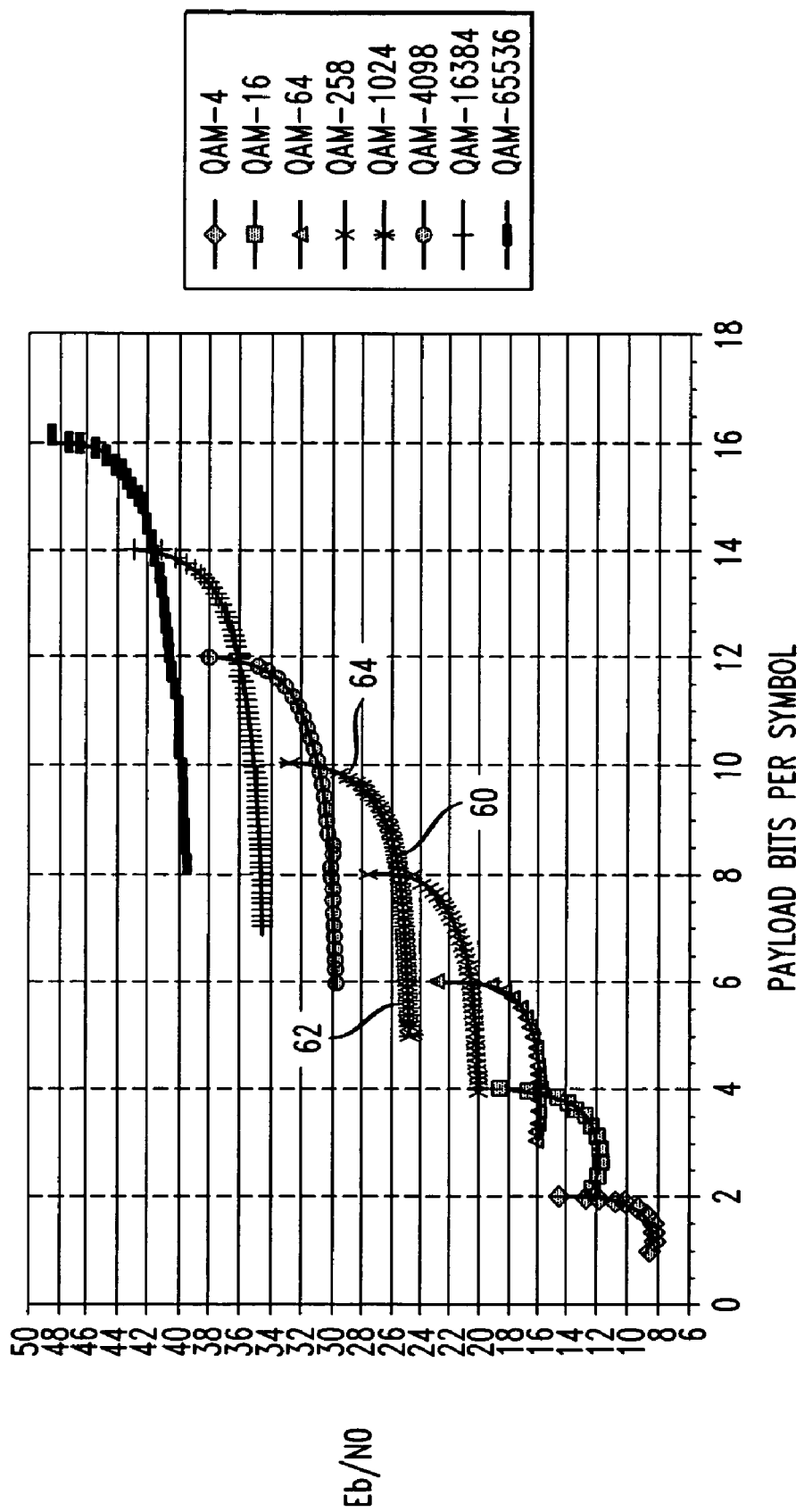
FIG. 3 shows a graph that illustrates the relationship between the density of parity symbols employed by an outer coder and the signal to noise power required to achieve a predetermined bit error rate for various signal constellation sizes.

The efficiency of the outer coder 38 may be illustrated by graphing the power required to achieve a certain bit error rate as a function of parity symbol density or rate. FIG. 3 includes such a graph. The y-axis of the graph indexes the transmit signal to noise power required to achieve a given bit error rate, while the x-axis of the graph indexes the payload bits per modulation symbol (which includes the total number of payload and parity bits).

It is to be noted that the use of the term "symbol" in the context of FIG. 3, as a modulated symbol, is distinguished from the payload symbols and parity symbols output by the outer coder 38. In particular, as will be discussed further below, the "symbols" generated by the outer coder 38 are subsequently modulated into a series of modulated symbols, such as QAM symbols. Although each individual modulated symbol may or may not include parity bits and/or payload bits, the stream of modulated symbols will include an average number of payload bits per symbol, and a complementary average number of parity bits per symbol. Thus, one measure of the density of parity information is the average number of payload bits per modulated symbol. The graph of FIG. 3 employs that measure as its x-axis index.

As shown in the graph, for a given constellation size, the required signal to noise power increases as number of payload bits per modulated symbol increases. For example, reference is made to the QAM-1024 curve 60. A QAM-1024 symbol may have one of 1024 possible constellation positions or values. Because 1024 is equal to $2^{10}$, each QAM-1024 symbol carries ten bits worth of information. As illustrated in the graph of FIG. 3, more power is required as the number of payload bits per symbol moves toward ten. At ten payload bits per symbol, no parity symbols are present, and maximum power is required.

It can be observed that the increase in power requirement is not linear. In particular, as shown, for example, by the 1024-QAM curve 60, the curve 60 moves from a low slope region 62 from five to eight bits per parity symbol to a high slope region 64 between nine to ten bits per symbol. It can be seen that very little increase in power is necessary to increase the bits per symbol from six to seven. Accordingly, the outer coder 38 may not be optimized at six bits per symbol using 1024-QAM modulation because only a small increase in power yields a large effective data rate increase. Contrariwise, it can be seen that significantly more power is necessary to increase the bits per symbol from nine to ten. As a result, the outer coder 38 may not be optimized at ten bits per symbol using 1024-QAM modulation because only a small decrease in data rate (i.e. from ten to nine payload bits per symbol) yields a significant power requirement reduction.

Figure 4:
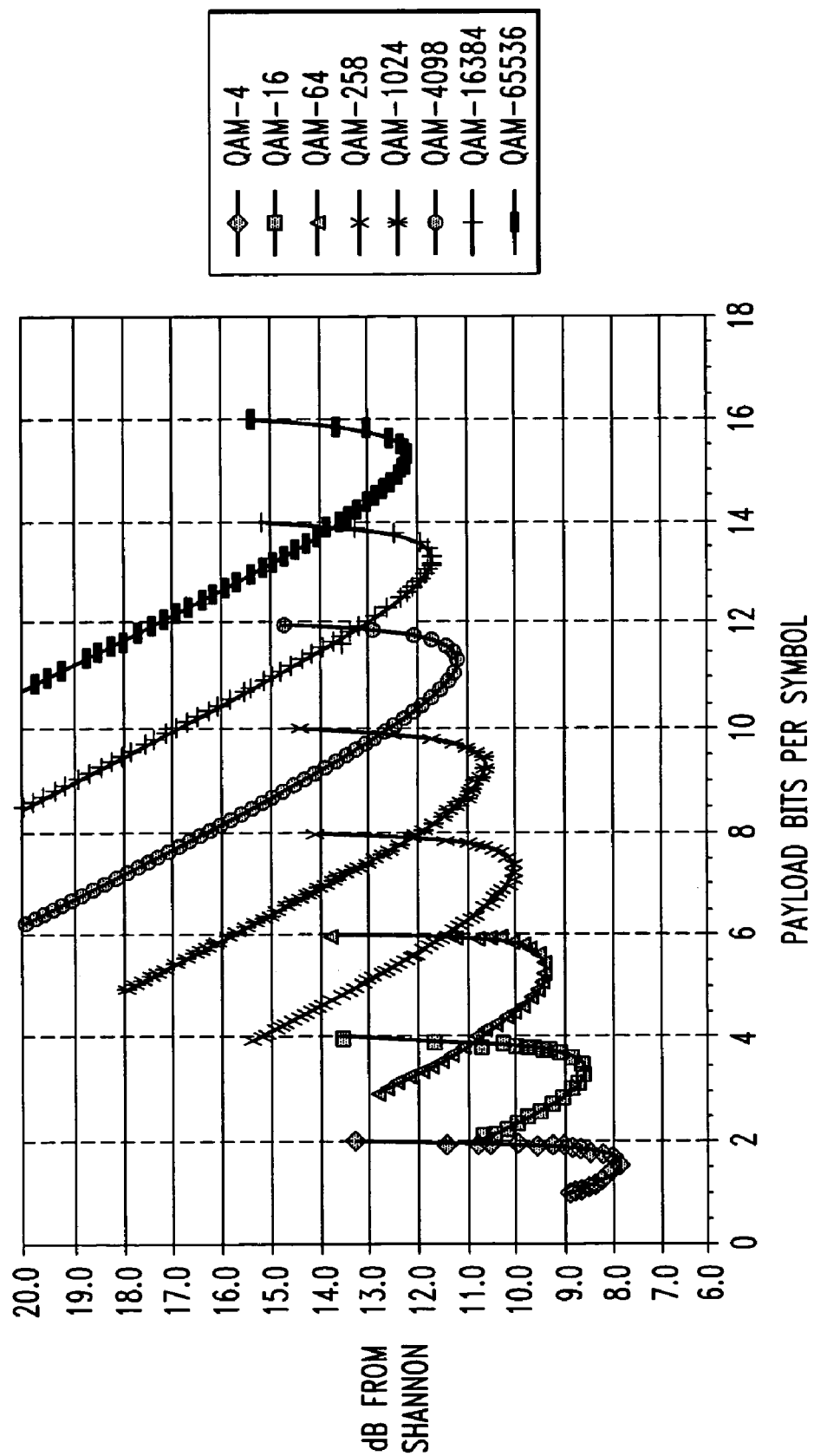
FIG. 4 shows a graph that illustrates the relationship between the density of parity symbols employed by an outer coder and the distance from the Shannon efficiency point for various signal constellation sizes.

The efficiency of the outer coder 38 for a given modulation type may be illustrated by a graph showing the distance from the Shannon efficiency for the coder as a function of payload bits per symbol. The Shannon efficiency is a theoretical limit of transmission efficiency for a given channel. Thus, the distance from Shannon illustrates how closely a given channel is operating to its theoretical efficiency limit. FIG. 4 illustrates an exemplary graph of curves showing the distance from Shannon efficiency as a function of payload bits per symbol for the same modulation types as those illustrated in FIG. 3. Referring again by way of example to the 1024-QAM curve 66, it can be seen that the outer coder 38 is relatively inefficient at points below eight bits per symbol and at points approaching ten bits per symbol, which corresponds to the analysis of the curve 60 of FIG. 3 discussed above.

Figure 7:
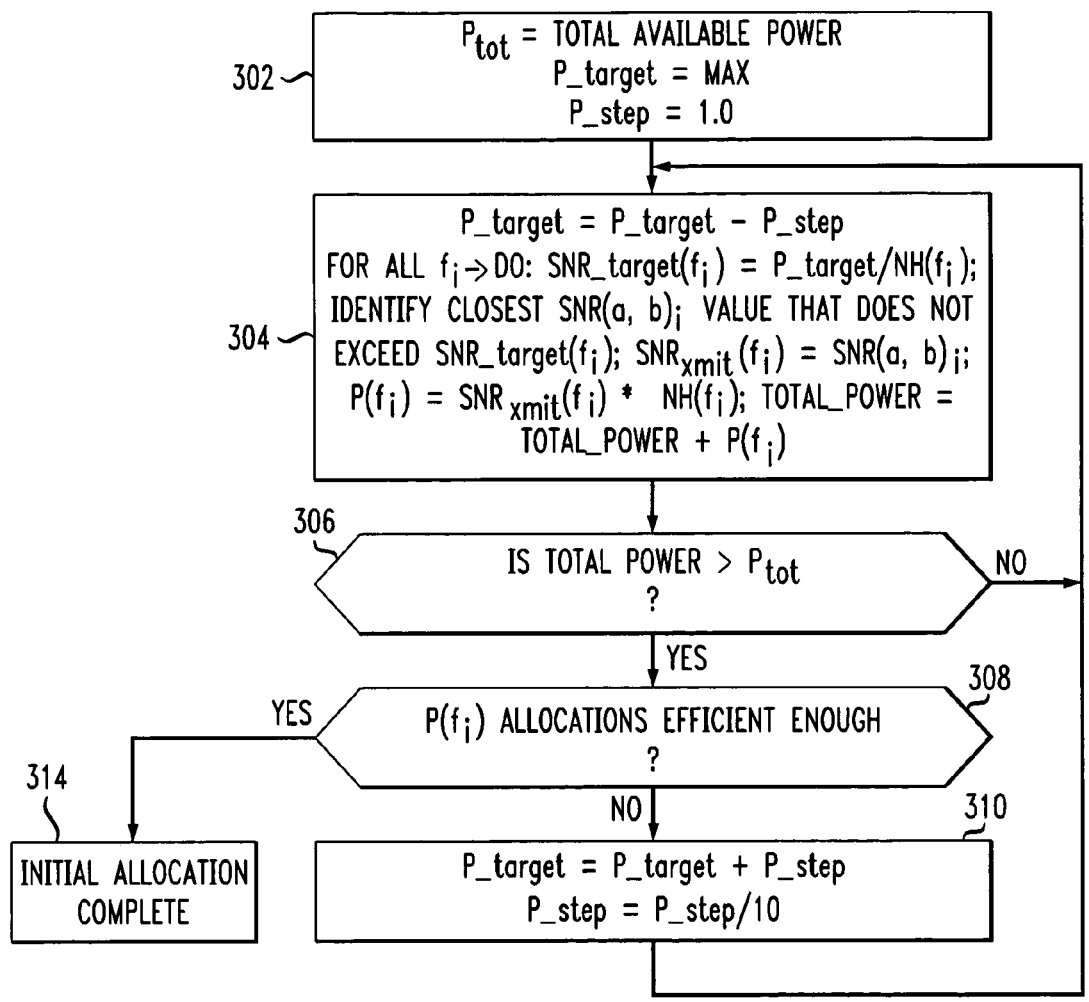
FIG. 7 shows a flow diagram of the initial allocation operations of the DSL modem of FIG. 2.
Figure 8:
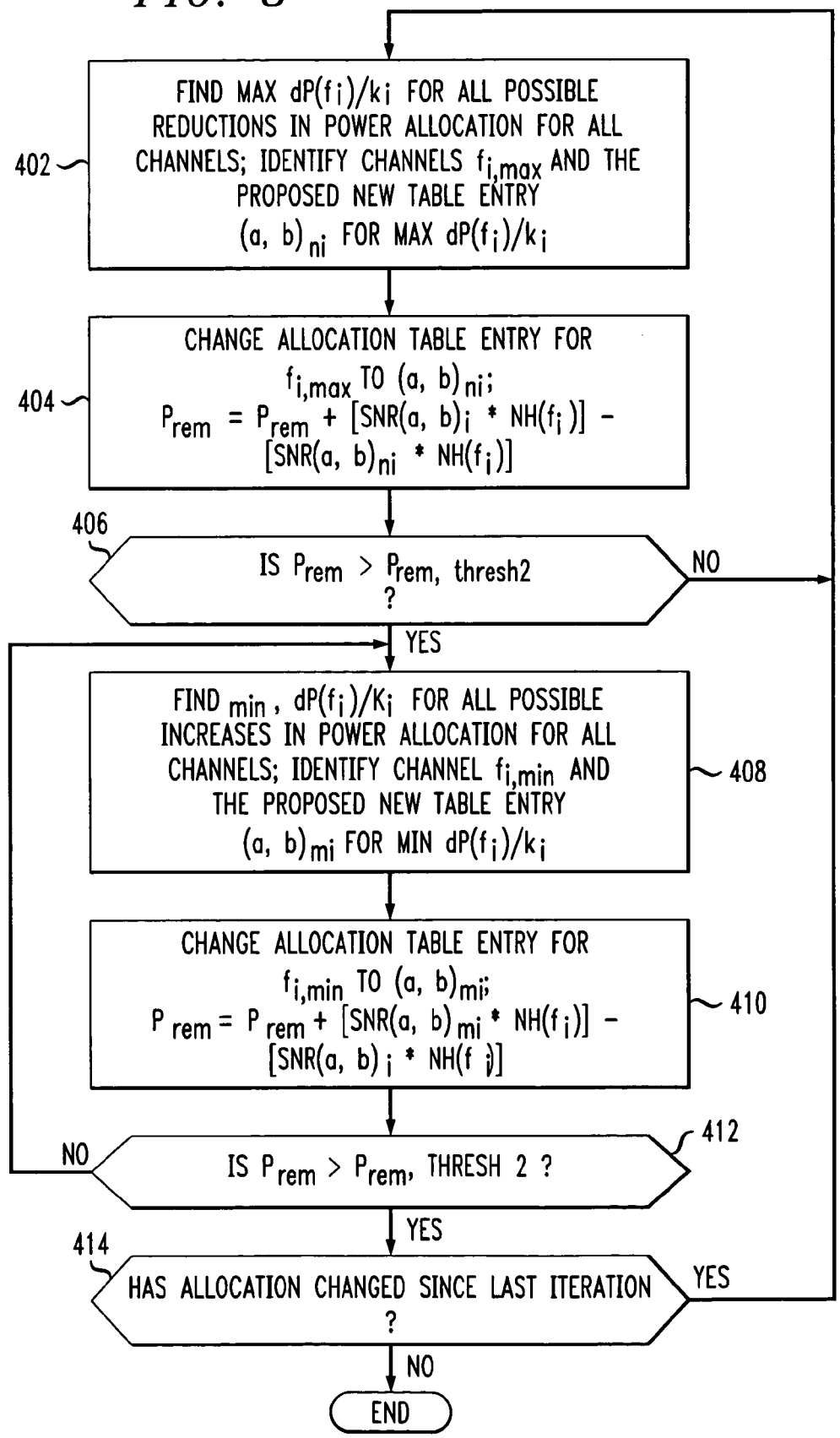
FIG. 8 shows a flow diagram of the remove/add allocation operations of the DSL modem of FIG. 2.

One aspect of the present invention which will become more readily apparent below in connection with the discussion of FIGS. 7 and 8 is that power is allocated between the various bins in a manner that tends to push the efficiency of each channel towards its nearest point to the Shannon efficiency. By contrast, attempting merely to optimize equal power allocation among the channels, as provided by the prior art water pouring algorithm, results in channels operating at points that are not nearest their Shannon efficiency.

Referring again specifically to FIG. 2, the allocation processor 54 in accordance with one aspect of the present invention attempts to coordinate the allocation of bits between the various bins and in such a way as to allow the outer coder 38 to use a parity symbol rate for each channel that causes the outer coder 38 to operate in a relatively efficient portion of its bits per symbol rate curve for the modulation rate. Such choice of parity symbol rate will depend on the noise and channel attenuation of each particular channel.

The inner coder 40 is an encoding device that generates encoded digital signals having I and Q vector values such as those ordinarily used to define positions in quadrature amplitude modulation ("QAM") signal constellation space. One of the primary operating parameters of the inner coder 40 is the constellation size employed by the inner coder 40 to encode a set of input signals. For example, the inner coder may employ constellation sizes that correspond to 4-QAM, 16-QAM, 64-QAM, 256-QAM and even larger QAM constellation sizes. Larger constellation sizes provide a higher data rate, but typically require a greater signal to noise ratio to achieve an acceptable bit error rate. (See, e.g., FIG. 3).

In the exemplary embodiment described herein, the inner coder 40 comprises a trellis coder that is operable to add overhead/parity information that increase the effective bit error rate of the signal, however at a cost of the additional overhead bits. Nevertheless, it has been found that overall efficiency of a DSL modem may be increased by incorporating trellis encoding.

Regardless of the actual design of the inner coder 40, the output of the inner coder 40 may be characterized by the constellation size used to encode the input data bits, regardless of the amount of overhead added by the coder. Thus, the inner coder 40 is operable to receive data blocks for each of the N bins from the outer coder 38 and produces encoded signals having particular constellation size for each of the bins. If the inner coder 40 is, for example, a trellis encoder, then additional overhead bits are added. For example, the trellis inner coder 40 may produce for a particular bin a four bit constellation size (16-QAM) of input bits plus trellis overhead.

It is noted, however, that the input bits to the inner coder 40 include both payload data and parity symbol overhead previously added by the outer coder 38. Thus, the encoded data signal produced by the inner coder 40 includes the payload data from the demultiplexer 36 as well as overhead added by the outer coder 38 and the inner coder 40.

As discussed above, the constellation size selected for each bin largely defines the effective data rate of the transmitted signal. For example, a 4096-QAM signal has several times the data rate of a 64-QAM signal. As mentioned above, the additional data rate comes at a cost of signal power, however. For example, the transmit signal to noise ratio required to send a 4096-QAM signal at a select bit error rate is much higher than the signal to noise ratio required to send a 64-QAM signal at that same bit error rate. As shown in FIG. 3, the curves for the higher constellation size signals tend to require increasingly more power.

As a general matter, large constellation sizes are used in bins associated with transmission channels that have less noise and attenuation because such channels may support a larger signal to noise ratio with less transmission power. By contrast, small constellation sizes will be used in bins associated with transmission channels that are noisier and/or have more attenuation. As also shown in FIG. 3 and discussed above, increasing the outer coder parity symbol rate (i.e. reducing the payload bits per parity symbol on the graph of FIG. 3) tends to reduce the signal power requirement for a given constellation size. However, as more parity symbols are employed by the outer coder 38, less bits of the actual n-QAM constellation size are actually dedicated to payload bits, and the effective data rate is thus reduced.

The combination of the efficiency characteristics of the outer coder 38 and the inner coder 40 is therefore a multi-variable function that is dependent upon the parity symbol rate or density of the outer coder 38 and the constellation size employed by the inner coder 40. As discussed above, the allocation processor 54 adjusts the operation of the outer coder 38 to improve the efficiency of the overall transmission by selecting the parity symbol rate that balances transmission power requirements and parity symbol overhead in an advantageous manner. Similarly, the allocation processor 54 adjusts the constellation size of the inner coder 40 to balance power requirements with overall data rate. To this end, the allocation processor 54 provides to the inner coder 40 parameter control information that causes the inner coder 40 to encode data signals for each of the N bins with a specific constellation size adjusted to suit the noise and attenuation characteristics present in the channel.

The inner coder 40 is operably connected to provide encoded I,Q signals to the gain adjust block 41. The gain adjust block 41 is a device that adjusts the gain for each of the N bins in accordance with control signals provided by the allocation processor 54. In particular, the allocation processor 54 determines the power required to achieve a predetermined bit error rate, given the chosen operating parameters of the outer coder 38 and inner coder 40 for each channel, as part of its operations to improve efficiency, as will be discussed further below in connection with FIG. 5.

The gain adjust block 41 is operably connected to provide the gain adjusted, I, Q encoded digital signal to the modulator/IFFT block 42. The modulator/IFFT block 42 is a device or functional block that is operable to modulate the data from each of the N bins onto corresponding tones of the multitone signal. The modulator/IFFT 42 is further operable to transform the modulated signal into the time domain using an inverse fast Fourier transform. The resulting signal is the final digital output signal. The modulator/IFFT block 42 is thus operable to receive gain adjusted encoded digital signal from N bins and generates a digital time domain, modulated signal therefrom.

The modulator/IFFT 42 is operably coupled to provide the time domain output signal to the D/A converter 44. The D/A converter 44 is operable to convert the digital signal to an analog signal. The D/A converter 44 is operably coupled to provide the analog signal to the analog transmitter 46. The analog transmitter 46 is a circuit that is operable to perform any filtering, amplification and conditioning to the analog signal necessary to facilitate transmission of the analog output signal over the subscriber loop 20 (See FIG. 1). Such circuits are well known in the art.

In general, the receiver path 32 is the analog of the transmitter path 30, and the details of its operation are not particularly germane to the exposition of the present invention. Nevertheless, in general, the analog receiver 52 receives analog signals that include digital, DMT-modulated information. The analog receiver 52 is a circuit that is operable to properly scale, filter and otherwise condition the received signal for conversion to a digital DMT-modulated signal. The analog receiver 52 is operably coupled to provide the received signal to the A/D converter 54. The A/D converter 54 converts the received and conditioned analog signal into a digital signal in the form of a time domain, DMT-modulated data signal. The A/D converter 54 is operably coupled to provide the digital signal to the digital receiver 48.

The digital receiver 48 includes the appropriate decoding, demodulating and FFT devices or functions that are necessary to convert the time domain, DMT-modulated data signal into a digital data baseband signal. As discussed above the digital receiver 48 contains the analog to the coders 38, 40 and modulator/IFFT 42 of the transmission path 30.

The allocation processor 54 is a processing device, or a functional portion of a processing device or circuit, that is operable to control the allocation of data bits to each of the N bins, control the allocation of power to each of the N bins, and control operational parameters of the outer coder 38 and inner coder 40. The allocation processor 54 controls such elements in an accordance with methods of the invention to reduce the amount of power required to transmit at a given data rate having a given bit error rate. To this end, the allocation processor 54 performs the operations describe below in connection with FIG. 6. The allocation processor 54 is operably connected to the table look up memory 56 to obtain configuration data pertaining to the transmission path 30.

In particular, the table look up memory 56 contains a table of data that identifies, for a given desired bit error rate, a value representative of the transmission signal to noise ratio required to achieve a particular payload data transmission rate. The payload data transmission rate in the abstract is defined by the constellation size of the inner coder 40, less the parity bits added by the outer coder 38. Thus, each record on the table is associated with the encoder parameter values that are required to achieve the payload transmission data rate.

In particular, as used herein, each table entry is defined by its associated parameter settings (a, b), where a is a value representative of the parity byte density of the outer coder 38 and b is a value representative of the constellation size of the inner coder 40. The associated data rate k for each table entry (a, b) may be derived as a function of a,b, as discussed further above. The signal to noise power SNR(a, b) required to transmit at the rate k defined by the parameters (a, b) is stored in connection with the table entry (a, b).

The table entries (a, b) are stored as an ordered table entry list, in which the table entries are stored in ascending SNR(a, b) values, i.e. ascending signal to noise power requirement values. Moreover, the table entries are also stored in ascending data rate values k, which is a function of (a, b). Thus, movement up the list identifies a set of parameters settings (a, b) that have a higher data rate k and a higher signal to noise requirement SNR(a, b), while movement down the list identifies a set of parameter settings (a, b) that have a lower data rate k and a lower signal to noise requirement SNR(a, b).

The allocation processor 54 employs the table entry list in the memory 56 to determine appropriate parameters for the outer coder 38 and inner coder 40 in the allocation of transmission power to each of the N bins. In doing so, the allocation processor 54 further employs the table entry list to determine efficient allocation of input bits and transmission power to each of the bins as described below in connection with FIGS. 7 and 8. In essence, the allocation processor 54 attempts to cause each channel to operate at or near its most efficient point, for example, the point nearest its Shannon efficiency for a given data rate. (See FIG. 4).

Figure 5:
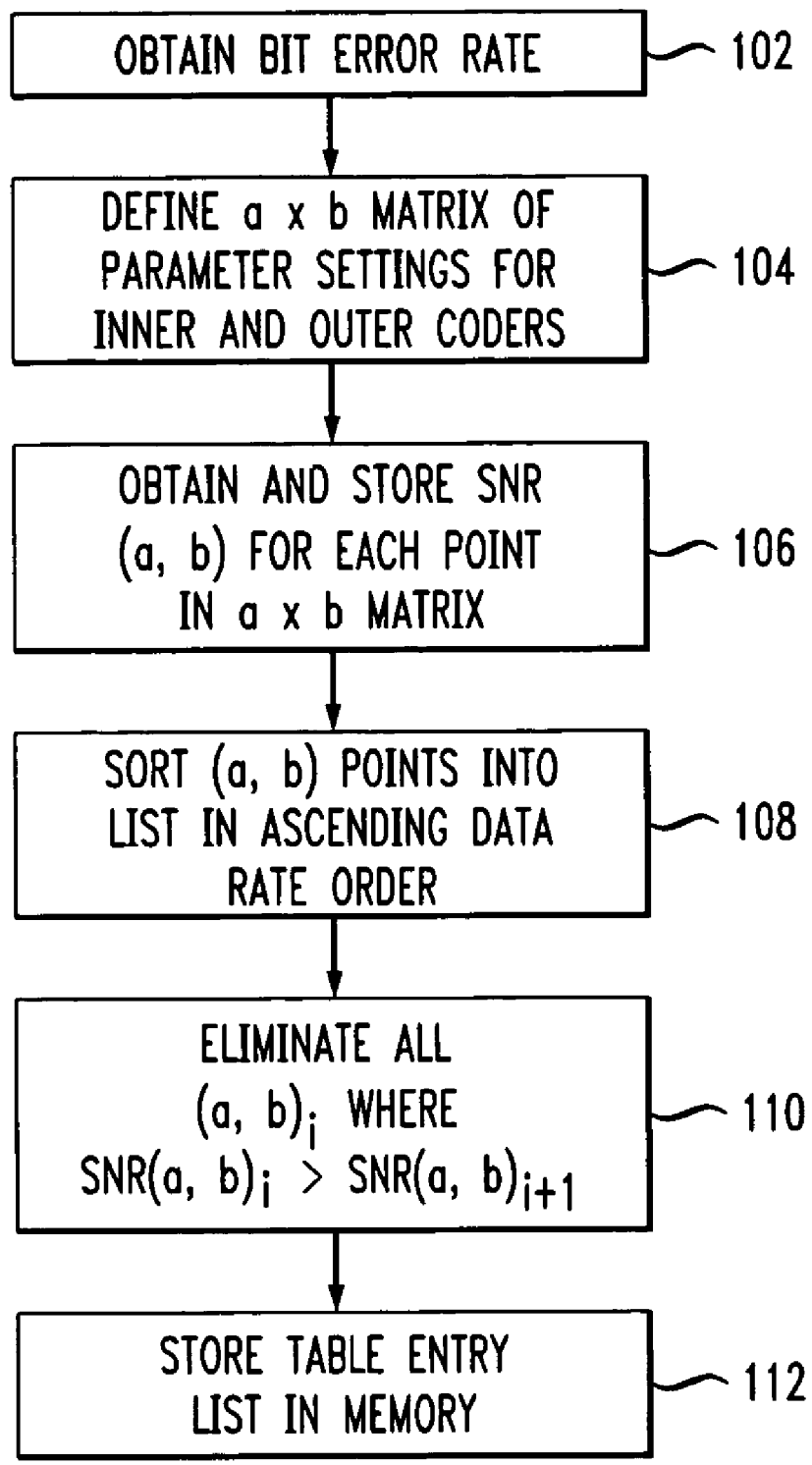
FIG. 5 shows a flow diagram of an exemplary set of operations for setting up a coder parameter set list for use in the allocation techniques table look-up of the DSL modem of FIG. 2.

FIG. 5 shows an exemplary set of operations that are used to configure the table entry list in the memory 56. As an initial matter, in step 102, a bit error rate is selected for the table entry list. Then, in step 104, an a×b matrix is defined that is indexed by a set of a possible parity symbol rate settings for the outer coder 38 and a set of b possible input bit constellation sizes for the inner coder 40. Each point (a, b) in the matrix represents an effective transmission data rate. As discussed above, the effective data rate may be calculated from the parameters (a, b) essentially from subtracting the parity symbol bits defined by a from the constellation size defined by b. The derived data rate may optionally be stored for each matrix position. However, it will be appreciated that even if the actual data rate is not stored, the information sufficient to calculate the effective data rate may readily be calculated for each matrix position (a, b).

In step 106, the a×b matrix is populated with transmission signal to noise requirements, SNR(a, b), required to transmit each bit reliably at the predetermined bit error rate using the parameters (a, b). To this end, tests may be conducted for each point (a, b) of the matrix in which the transmission power is varied over a range in a known noise environment until the desired bit error rate is achieved.

Once the signal to noise requirement SNR(a, b) for each point (a, b) of the matrix is identified, the matrix is sorted into a preliminary table entry list in step 108. Similar to the table entry list discussed above, the preliminary table entry list is in an order that ascends from the least effective data rate value to the highest effective data rate value. Thus, for example, from any particular position on the list, the next highest position will have a higher effective data rate and the next lowest position will have a lower effective data rate. As with the matrix, each point on the list is indexed by its (a, b) parameters and contains a required signal to noise value SNR(a, b).

Unlike the table entry list, the preliminary table entry list is not necessarily in ascending order with respect to the required signal to noise value SNR(a, b). In other words, because some configurations a, b of the coders 38, 40 are relatively inefficient, even low data rates can require a relatively high signal to noise requirement. In step 110, these inefficient points are removed from the list. To this end, the preliminary table entry list is ascended from the least data rate point to the highest data rate point. During this ascending operation, any point (a, b)$_i$ in which the signal to noise requirement SNR(a, b)$_i$ is higher than that of the next highest point, (a, b)$_{i+1}$, is removed. In other words, if for any point (a, b)$_i$: SNR(a, b)$_i$>SNR(a, b)$_{i+1}$, then the point (a, b)$_i$ is removed from the table entry list. The point is (a, b)$_i$ is removed because its parameter configuration would never be used, since one may achieve a higher data rate (i.e. at (a, b)$_{i+1}$) while using less power simply by employing the (a, b)$_{i+1}$ parameter configuration.

The entire preliminary table entry list is scanned until all such points are removed. The resulting list is the table entry list. The table entry list comprises a list of parameter configurations (a, b) that are monotonically ascending in both effective data rate and signal to noise power requirement values. In step 112, the final table entry list is stored in the table took-up memory 56 of the DSL modem 10.

Figure 6:
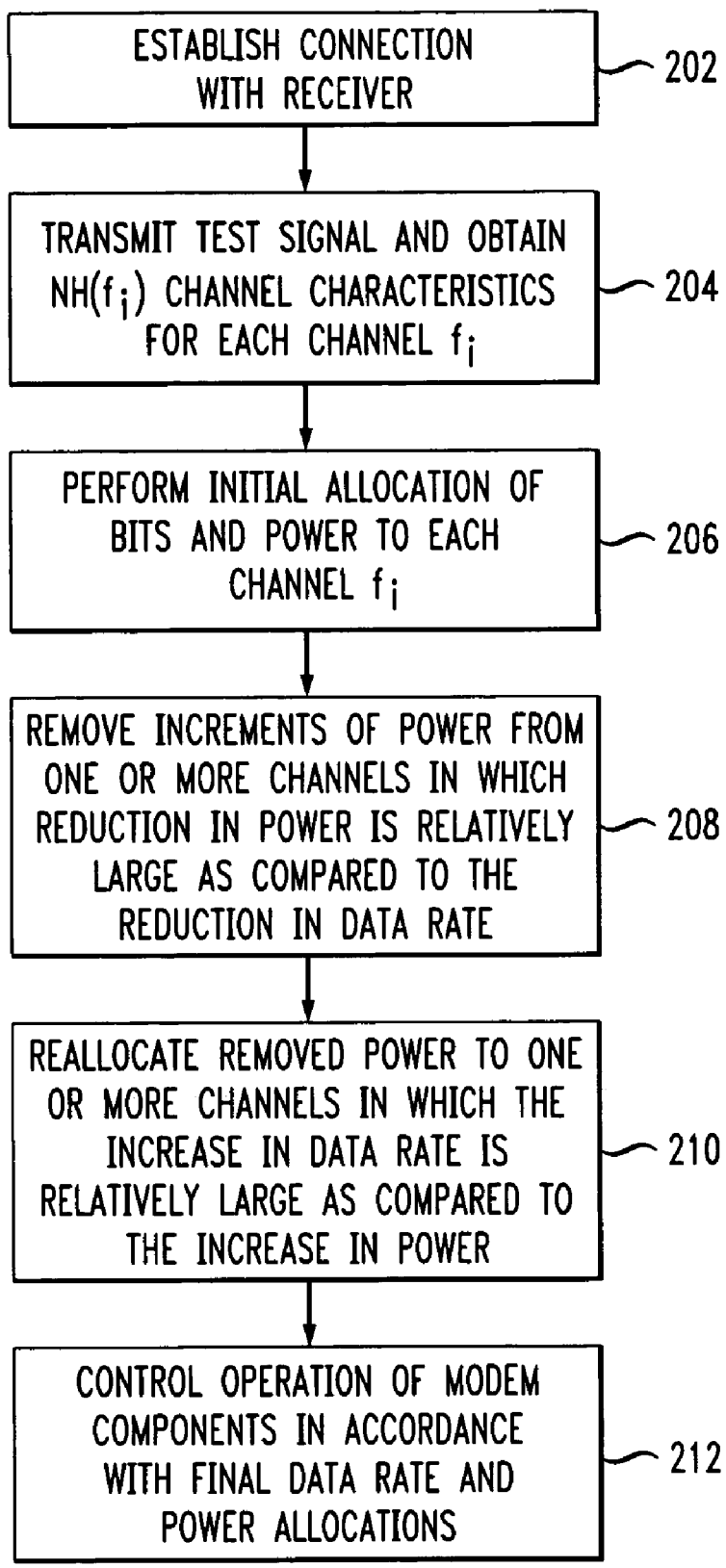
FIG. 6 shows an exemplary set of operations performed by a processing circuit of the DSL modem of FIG. 2

The configuration of the table entry list described above in connection with FIG. 5 may preferably occur prior to use of the DSL modem 10. FIG. 6, by contrast, shows the operations of the DSL modem 10 during the course of an ordinary communication operation. FIG. 6 will be described with simultaneous reference to FIGS. 1 and 2.

First, in step 202, a connection is established with the receiver of the DSL modem signals. In the exemplary embodiment shown in FIG. 1, the receiver is the DSLAM 26, which can then transmit the signal over the Internet 18 to the final destination.

Thereafter, in step 204, the allocation processor 54 causes a test signal to be transmitted to the receiver. The test signal is preferably a pseudorandom noise signal having known content. The receiver, i.e. the DSLAM 26, compares the received signal with its known content in order to obtain the channel transfer function H(f), where f may suitably be the frequency of each tone of the multitone signal on which data may be modulated. The DSLAM 26 also measures the channel noise power N(f) by measuring the channels f while the transmitter is silent. The allocation processor 54 obtains these values and calculates the ratio of noise power to channel attenuation NH(f)=N(f)/|H(f)|$^2$. The ratio NH(f) represents a measure of the noise power and attenuation that the transmitted signal is required to overcome to ensure detection at the receiver. The allocation processor 54 stores the NH(f$_i$) values for each channel f$_i$ locally.

Thereafter, in step 206, the allocation processor 54 performs an initial allocation of power and bits to each bin or channel f$_i$ of the multitone signal. The initial allocation is based on a substantially even distribution of signal power over the channels, with some local optimization. In practice, the initial allocation may suitably be any water pouring type algorithm, such as those known in the art. FIG. 7, described below, illustrates in further detail an exemplary initial allocation procedure that may be used in step 206.

In accordance with one aspect of the present invention, the initial allocation performs its optimization step by selecting various combinations of parameters of both the outer coder 38 and inner coder 40. In other words, the initial allocation does not merely adjust the operation of either the outer coder 38 or inner coder 40 alone, but selects from combinations of various settings for each coder, thereby increasing the potential efficiency of the initial allocation.

At the end of step 206, the allocation processor 54 has defined an initial transmit power allocation, P(f$_i$), and an initial bit rate allocation, k(f$_i$), for each channel f$_i$. In general, the values of P(f$_i$) and k(f$_i$) for each channel correspond to a point (a, b) in the table entry list stored in the table look-up memory 56, and thus has associated with it a set of coder parameters, a, b. In particular, during the initial allocation of step 206, the allocation processor 54 selects an appropriate initial table entry list point (a, b)$_i$ for each channel f$_i$. The bit rate associated with the parameters (a, b)$_i$ for that entry represents the initial bit allocation rate k(f$_i$) and the required signal to noise value SNR(a, b)$_i$ is used to derive the initial transmit power P(f$_i$). The initial transmit power P(f$_i$) is set equal to the amount of power required to achieve the required signal to noise SNR(a, b)$_i$ over the channel f$_i$ given the noise and attenuation characteristics NH(f$_i$) for the channel.

After initial allocation, the allocation processor 54 begins an iterative incremental reallocation process described below in connection with steps 208–210. In step 208, the allocation processor 54 removes increments of power from one or more channels f$_i$ in which a relatively small decrease in data rate k(f$_i$) results in a relatively large decrease in power P(f$_i$). To this end, the allocation processor 54 finds alternative points (a, b)$_{ni}$ on the table entry list for the one or more channels using the table look-up memory 56, wherein the alternative points (a, b)$_{ni}$ provide a change in effective data rate k(f$_i$) that is relatively small compared to the amount of decrease in the SNR(a, b)$_i$. The newly found list entries define the new k(f$_i$) and P(f$_i$) allocation for the affected channel(s) f$_i$. The power that is removed from these channels is excess power that may be reallocated in step 210.

In step 210, the allocation processor 54 reallocates the excess power to one or more other channels f$_i$ in which a relatively small increment in power P(f$_i$) results in a relatively large increase in data rate k(f$_i$). To this end, the allocation processor 54 finds alternative list entries (a, b)$_{mi}$ from the table look-up memory 56 in which the change in effective data rate k(f$_i$) is relatively large compared to the amount of increase in the SNR(a, b)$_i$. The newly found list entries define the new k(f$_i$) and P(f$_i$) allocation for those affected channel(s) f$_i$. In this manner, power is reallocated into channels in which it is used more efficiently.

After step 210, the allocation processor 54 has an improved allocation of power P(f$_i$) and bit rate k(f$_i$) for the various channels f$_i$ of the multitone signal. Further details regarding steps 208 and 210 are provided below in connection with FIG. 8. After step 210, the allocation processor 54 may configure the DSL modem 10 for operation. To this end, the allocation processor 54 proceeds to step 212.

In step 212, the allocation processor 54 then controls the operation of the demultiplexer 36, the outer coder 38, the inner coder 40, and the gain adjust block 41 accordingly. In particular, the allocation processor 54 controls the demultiplexer 36 to allocate bits to each bin f$_i$ in accordance with the data rate k(f$_i$) as defined by the corresponding table list entry (a, b)$_i$ employed for each bin. The allocation processor 54 then provides control signals that cause the outer coder 38 to use the amount of parity symbols that correspond to the value of a corresponding to the table list entry (a, b)$_i$ for each channel f$_i$. Similarly, The allocation processor 54 then provides control signals that cause the inner coder 40 to use the constellation size that corresponds to the value of b corresponding to the table list entry (a, b)$_i$ for each channel f$_i$. The allocation processor 54 furthermore controls the gain adjust block 41 such that the gain for each channel f$_i$, corresponds to its P(f$_i$) value.

So configured, the DSL modem 10 may begin to transmit data received from the data source 12. The received digital data is multiplexed into the N bins (f$_i$ where i=1 to N) by the demultiplexer 36. As discussed above, the allocation processor 54 controls the demultiplexer 36 to effect the proper allocation of bits to the various bins. The demultiplexer 36 provides the multiplexed digital data to the outer coder 38. The outer coder 38 codes the data of each bin f$_i$, adding parity symbols at a rate defined by the a parameter for the table entry (a, b)$_i$ selected for the corresponding bin f$_i$. The outer coder 38 provides the coded signal to the inner coder 40. The inner coder 40 likewise codes the data of each bin f$_i$, adding overhead information and using a constellation size defined by the b parameter for the table entry (a, b,)$_i$ selected for the corresponding bin f$_i$. The inner coder 40 then provides the encoded digital data, typically as an I, Q vector value, to the gain adjust block 41.

The gain adjust block 41 individually adjusts the gain for each bin f$_i$ in accordance with the P(f$_i$) value provided by the allocation processor 54. The gain adjust block 41 provides the gain adjusted, encoded signal to the modulator/IFFT block 42. The modulator/IFFT block 42 modulates the signal for each bin onto its selected tone frequency f$_i$ and then performs an inverse fast Fourier transform to generate a time domain signal. The resulting signal is provided the D/A converter 44 and thereafter to the analog transmitter 46.

The analog transmitter 46 conditions and transmits the signal over the subscriber loop 20. The signal propagates through the loop transmission facility 22 to the central office 24. The central office 24 switches the signal to the DSLAM 26. The DSLAM 26 receives the signal and obtains the data therefrom. The DSLAM 26 may then transmit the data signal over the Internet 18 to one or more receiving computers 14.

FIG. 7 shows an exemplary initial allocation algorithm that may be employed by the allocation processor 54 or another processing circuit in a multi-frequency communication device. The operations of FIG. 7 may suitably be used as the initial allocation step 206 of FIG. 6. In general, the initial allocation algorithm of FIG. 7 begins by allocating much more power than is available to each channel and then removes power from all of the channels until the allocated power is equal to the actual available power.

As an initial matter, several variables are initialized. Specifically, in step 302, the allocation processor 54 sets P$_{tot}$ equal to the total power that is actually available for the transmission, sets P_target=MAX, and sets P_step=1.0. P_target represents the amount available to be allocated to each channel or bin during each iteration of the algorithm. The value MAX is a large initial value that represents much more power than each channel could possibly be allocated. Thus, in other words, MAX*N is greater than P$_{tot}$, where N is equal to the number of channels. P_step is the value of power removed from each channel during each iteration of step 304, discussed below.

After initialization of variables in step 302, the allocation processor 54 proceeds to step 304. In step 304, the allocation processor 54 decreases the available per bin power P_target by the value of P_step. Thereafter, the allocation processor 54 determines the per bin power allocation P(f$_i$) based on the highest data rate that is sustainable on each channel f$_i$ using P_target. Because P_target typically does not correspond exactly to the highest achievable data rate, P(f$_i$) will typically be less than P_target.

Specifically, the maximum data rate achievable given a value P_target may be determined by identifying the maximum signal to noise ratio SNR_target(f$_i$) available for each channel f$_i$. The maximum signal to noise ratio is determined by taking the power available, P_target, and dividing the available power by the measure of noise and attenuation for the channel, given by NH(f$_i$). Thus, the maximum available signal to noise ratio, SNR_target(f$_i$) is given by $$SNR\_target(f_i)=P\_target/NH(f_i)$$

Thereafter, the allocation processor 54 determines, for each channel, the table entry (a, b) having the highest signal noise requirement SNR(a, b) that is less than or equal to SNR_target(f$_i$). That point represents the highest sustainable data rate k(f$_i$), because the next highest point on the table (with a higher data rate) requires more signal to noise power than is available for the channel f$_i$.

Typically, no table entry (a, b) has an SNR(a, b) value that is exactly the same as the available signal to noise value SNR_target(f$_i$) for a given channel, due to the quantization steps between entries on the table entry list. As a consequence, the SNR_target(f$_i$) will usually fall between two adjacent SNR(a, b) values on the table. The lower of the two adjacent SNR(a, b) values represents the maximum sustainable data rate, given the SNR_target(f$_i$) value. The SNR(a, b) corresponding to that point on the table entry list becomes the transmit SNR of the channel, or SNR$_{xmit}$(f$_i$). The difference between SNR$_{xmit}$(f$_i$) and SNR_target(f$_i$) is representative of the excess power (normalized for the channel f$_i$) because that additional power does not increase the bit rate that may be supported.

After the transmit SNR, SNR$_{xmit}$(f$_i$), of the channel f$_i$ is determined, the allocation processor 54 determines the actual power required to achieve the SNR$_{xmit}$(f$_i$). The actual power required to be transmitted, P(f$_i$) is obtained by factoring in the noise and attenuation characteristics of the channel:

$$P(f_i)=SNR_{xmit}(f_i)*NH(f_i)$$

Thus, the allocation processor 54 in step 304 postulates a power allocation that eliminates unused excess power from each channel. The allocation processor 54 then calculates the sum of the transmit power allocations to all channel f$_i$, given by $$Total\_Power=\Sigma P(f_i), \text{ for } i=1 \text{ to } N$$

In step 306, the allocation processor determines whether the total power allocated, Total_Power, is greater than the actual available power, P$_{tot}$. If so, then more power will have to be removed from the per channel power allocations P(f$_i$) by repeating step 304. Accordingly, if Total_Power>P$_{tot}$, then the allocation processor 54 returns to step 304 to remove more power from the per channel available power allocation P_target and to determine new P(f$_i$) values based thereon.

However, if in step 306 it is determined that Total_Power is not greater than P$_{tot}$, then the allocation processor 54 executes step 308. It will be appreciated that at step 308, the power allocations P(f$_i$) are potentially viable because their total (Total_Power) is equal to or less than the actual available power P$_{tot}$. Although the allocation is viable, it may not be very efficient. Accordingly, in step 308, the allocation processor 54 determines whether the allocation of power is efficient enough to end the initial power allocation algorithm. If so, then the initial allocation is complete and the allocation processor 54 proceeds to step 314. If not, then the initial allocation will continue and the allocation processor 54 executes step 310.

The determination of whether the allocation of power is efficient enough in step 308 may be made a number of ways. For example, the allocation processor 54 may determine whether the difference between the total power used and the actual available power is less than a threshold. For example, the allocation processor 54 may determine whether $(P_{tot}-\text{Total\_Power})<P_{thresh}$. In the alternative, the allocation processor 54 may simply determine whether P_step is less than a threshold. In particular, as will be discussed below, each iteration of step 310 results in the reduction of the value of P_step. It is noted that below some level, additional reduction of P_step will yield little or no improvement in the allocation of power among the channels or bins. Accordingly, the allocation processor 54 in step 308 may simply determine whether P_step is less than a predetermined level.

In any event, as discussed above, step 310 is executed if the answer in step 308 is in the negative, or in other words, if it is determined that the initial allocation is not complete. In step 310, the allocation processor 54 adds back P_step to the existing P_target value, and then reduces P_step to $\frac{1}{10}^{th}$ of its value. The allocation processor 54 thereafter returns to step 304.

These operations of step 310 effectively reverse the most recent decrease in P_target and then allow much smaller increments of P_step to be removed from the P_target value in ensuing iterations of step 304. The sum effect of steps 304–310 is that progressively finer changes of power allocation are used until a limit in resolution is reached, as determined by step 308.

As discussed above, the allocation processor 54 executes step 314 if the answer in step 308 is in the affirmative. In step 314, the initial allocation is complete for the set of N bins. Each bin $f_i$ is associated with a table entry $(a, b)_i$, and thus has a defined power signal to noise requirement $SNR(a, b)_i$, a transmit power requirement $P(f_i)=SNR(a, b)_i*NH(f_i)$, and a data rate $k_i$, which is a function of a and b of $(a, b)_i$.

FIG. 8 shows a flow diagram of an exemplary embodiment of the subsequent reallocation process of the present invention. FIG. 8 reallocates power to the bins, using the initial allocation described above in connection with FIG. 7 as a starting point. However, it will be appreciated that the operations of FIG. 8 may be used to efficiently reallocate power even if other initial power allocations are employed. The operations of FIG. 8 may suitably be used to carry out steps 208 and 210 of FIG. 6.

In step 402, the allocation processor 54 finds a maximum of the rate of change, $dP(f_i)/dk_i$, for all possible reductions in power for every bin. The rate of change $dP(f_i)/dk_i$ may be defined as:

$$dP(f_i)/dk_i = (P(f_{i,\,current(a,b)}) - P(f_{i,\,proposed(a,b)})/k_{i,\,current\,(a,b)} - K_{i,\,proposed(a,b)})$$

To this end, for each bin $f_i$, the difference between the power required to satisfy the existing table entry $(a, b)_i$ and that of each table entry having a lower $SNR(a, b)$ is calculated. Also, the difference between the effective data rate $k_i$ of $(a, b)_i$ and that of each table entry having a lower $SNR(a, b)$ is calculated. The table entry $(a, b)_{ni}$ for which the change in power required $dP(f_i)$ divided by the change in data rate $dk_i$ is maximized constitutes the maximum $dP(f_i)/dk_i$ point for that bin $f_i$. Moreover, the allocation processor 54 determines the frequency bin $f_{i,max}$ that has the maximum $dP(f_i)/dk_i$ for all bins. Once the maximum $dP(f_i)/dk_i$ for $f_{i,max}$ is identified, then the allocation processor 54 proceeds to step 404.

In step 404, the allocation processor 54 changes the table entry $(a, b)_i$ for the frequency $f_{i,max}$ to the table entry $(a, b)_{ni}$, at which point the $dP(f_i)/dk_i$ value is maximized. As a result, the power allocated to $f_{i,max}$, $P(f_{i,max})$ is reduced to $SNR(a, b)_{ni}*NH(f_{i,max})$, and the data rate $k_{i,max}$ is reduced to that corresponding to the settings $(a, b)_{ni}$. The difference between the previous power allocation and the new power allocation is added to $P_{rem}$. The result of the change is that relatively little effective data rate is lost in $f_{i,max}$, but a relatively large amount of power has been reclaimed for reallocation.

Thereafter, in step 406, the allocation processor 54 determines whether the remainder power $P_{rem}$ is greater than another predetermined threshold $P_{rem,\,thresh2}$. If not, then the allocation processor 54 returns to step 402 to find another bin in which the data rate may be reduced to obtain additional power savings. If, however, in step 406 it is determined that the remainder power $P_{rem}$ is greater than a predetermined threshold $P_{rem,\,thresh2}$, then the allocation processor proceeds to step 408 to reallocate the accumulated excess power $P_{rem}$.

Alternatively, in step 406, the allocation processor 54 may simply determine whether step 402 has been executed a predetermined number of times. If not, then the allocation processor 54 would return to step 402. If so, then the allocation processor 54 would execute step 408.

In any event, in step 408, the allocation processor 54 finds a minimum of the rate of change, $dP(f_i)/dk_i$, for all possible increases in power for every bin. The rate of change $dP(f_j)/dk_i$ is still defined as:

$$dP(f_i)/dk_i = (P(f_{i,\,current(a,b)}) - P(f_{i,\,proposed(a,b)})/k_{i,\,current\,(a,b)} - K_{i,\,proposed(a,b)})$$

However, unlike step 402, for each bin $f_j$, the difference between the power required to satisfy the existing table entry $(a, b)_i$ and that of each table entry having a higher $SNR(a, b)$ is calculated. Also, the difference between the effective data rate $k_i$ of $(a, b)_i$ and that of each table entry having a higher $SNR(a, b)$ is calculated. The table entry $(a, b)_{ni}$ for which the change in power required $dP(f_i)$ divided by the change in data rate $dk_i$ is minimized constitutes the minimum $dP(f_j)/dk_i$ point for that bin $f_i$. Moreover, the allocation processor 54 determines the frequency bin $f_{i,min}$ that has the minimum $dP(f_i)/dk_i$. Once the minimum $dP(f_i)/dk_i$ for $f_i$ is identified, then the allocation processor 54 proceeds to step 410.

In step 410, the allocation processor 54 changes the table entry $(a, b)_i$ for the frequency $f_{i,min}$ to the table entry $(a, b)_{ni}$, at which point the $dP(f_i)/dk_i$ value is minimized. As a result, the power allocated to $f_{i,min}$, $P(f_{i,min})$ is increased to $SNR(a, b)_{ni}*NH(f_{i,min})$, and the data rate $k_{i,min}$ is increased to that which corresponds to the settings $(a, b)_{ni}$. The difference between the previous power allocation and the new power allocation is subtracted from $P_{rem}$. The result of the change is that a relatively large effective data rate increase is obtained, and a relatively small amount of power has been reallocated from the $P_{rem}$.

Thereafter, in step 412, the allocation processor 54 determines whether the remainder power $P_{rem}$ is less than the predetermined threshold $P_{rem,\,thresh2}$. If not, then more power may be reallocated and the allocation processor returns to step 408 to find another bin in which a relatively small amount of power may be reallocated from $P_{rem}$ while obtaining a relatively large data rate increase. If however, $P_{rem}$ is less than the predetermined threshold $P_{rem,\,thresh2}$, then the allocation processor 54 proceeds to step 414.

In step 414, the allocation processor 54 determines whether the power allocation to the N bins has changed from the allocation that existed prior to the last execution of step 402 (i.e. after both the add and remove iterations of steps 404 and 410). If not, then the algorithm has converged and additional iterations will not result in any different power allocation. In such a case, the allocation processor 54 may stop the operations of FIG. 8 and begin controlling the DSL modem 10 in accordance with the final allocations, as described above in connection with step 112 of FIG. 6. If, however, the power allocation to any of the N bins has (changed during the last iteration, however, then the allocation processor 54 returns to step 402 to execute another reallocation iteration.

The above described embodiments are merely illustrative, and those of ordinary skill in the art may readily devise their own implementations that incorporate the principles of the present invention and fall within the spirit and scope thereof.

We claim:

1. A method of controlling a communication device, the communication device operable to transmit digital data over a plurality of frequency channels, the method comprising:
   a) selecting an initial transmission power allocation and a corresponding data rate allocation for each channel;
   b) identifying in a first channel a first ratio of a first decrement in transmission power to a first data rate decrement that is greater than a second ratio of a second decrement in transmission power to a second data rate decrement;
   c) reducing the initial transmission power allocation of the first channel by the first decrement; and
   d) reallocating the reduced initial transmission power allocation of the first channel to one or more other channels.

2. The method of claim 1 further comprising storing information representative of a plurality of data rates and corresponding transmission power requirements, and wherein b) further comprises identifying the first ratio based on the stored information.

3. The method of claim 2 wherein the stored information further comprises a stored plurality of combinations of coder parameters from which the plurality of data rates may be derived.

4. The method of claim 2 wherein the communication device further includes an inner coder and an outer coder, and wherein the stored information representative of each of the plurality of data rates and corresponding transmission requirements further comprises a combination of an inner coder parameter and an outer coder parameter.

5. The method of claim 1 wherein b) further comprises identifying in a first channel a first ratio of a first decrement in transmission power to a first data rate decrement that is greater than a second ratio of a second decrement in transmission power to a second data rate in a second channel.

6. The method of claim 1 further comprising repeating b), c) and d) a plurality of times.

7. The method of claim 1, wherein d) further comprises identifying in a second channel a first increase ratio of a first increment in transmission power to a first data rate increment that is less than a second increase ratio of a second increment in transmission power to a second data rate increment; and
   reallocating at least some of the reduced initial transmission power allocation by increasing the initial transmission power allocation of the second channel by the first increment.

8. An arrangement for use in a communication device, the communication device operable to transmit digital data over a plurality of frequency channels, the arrangement comprising:
   a multi-frequency transmission circuit operable to transmit digital data over the plurality of frequency channels, each of the plurality of frequency channels having a channel transmission power;
   a processor, the processor operably connected to the multi-frequency transmission circuit to control the channel transmission power of each of the plurality of frequency channels, the processor further operable to,
      select an initial transmission power allocation and a corresponding data rate allocation for each channel,
      identify in a first channel a first ratio of a first decrement in transmission power to a first data rate decrement that is greater than a second ratio of a second decrement in transmission power to a second data rate decrement,
      reduce the initial transmission power allocation of the first channel by the first decrement, and
      reallocate the reduced initial transmission power allocation of the first channel to one or more other channels.

9. The arrangement of claim 8 further comprising a memory storing information representative of a plurality of data rates and corresponding transmission power requirements, and wherein the processor is further operable to identifying the first ratio based on the stored information.

10. The arrangement of claim 9 wherein the stored information in the memory further comprises a stored plurality of combinations of coder parameters from which the plurality of data rates may be derived.

11. The arrangement of claim 8, wherein the multi-frequency transmission circuit includes an inner coder and an outer coder, and wherein the processor is operable to change at least one of an inner coder parameter and an outer coder parameter based on the decrement in the initial transmission power.

12. The arrangement of claim 11, wherein the processor is further operable to change at least an inner coder parameter and at least an outer coder parameter based on the decrement in the initial transmission power.

13. The arrangement of claim 11 wherein the outer coder comprises a linear block coder, and the outer coder parameter defines a ratio of parity symbols to payload symbols.

14. The arrangement of claim 13 wherein the linear block coder comprises a Reed-Solomon encoder.

15. The arrangement of claim 11 wherein the inner coder parameter defines a constellation size.

16. The arrangement of claim 15 wherein the inner coder comprises a trellis encoder.

17. The arrangement of claim 8 wherein the processor is further operably connected to control the allocation of data bits to the plurality of frequency channels.

18. The arrangement of claim 8, wherein the processor is further operable to:
   identify in a second channel a first increase ratio of a first increment in transmission power to a first data rate increment that is less than a second increase ratio of a second increment in transmission power to a second data rate increment; and
   reallocate at least some of the reduced initial transmission power allocation by increasing the initial transmission power allocation of the second channel by the first increment.

* * * * *